United States Patent
Heo et al.

(10) Patent No.: US 9,372,625 B2
(45) Date of Patent: Jun. 21, 2016

(54) CONTROLLER, DATA STORAGE DEVICE, AND DATA COMMUNICATION SYSTEM HAVING VARIABLE COMMUNICATION SPEED

(71) Applicant: Seagate Technology International, Grand Cayman (KY)

(72) Inventors: Keun Heo, Seoul (KR); Byung Wook Kim, Suwon-si (KR); Young Min Ku, Suwon-si (KR)

(73) Assignee: Seagate Technology International, Grand Cayman (KY)

( * ) Notice: Subject to any disclaimer, the term of this patent is extended or adjusted under 35 U.S.C. 154(b) by 191 days.

(21) Appl. No.: 13/850,844

(22) Filed: Mar. 26, 2013

(65) Prior Publication Data
US 2014/0122747 A1 May 1, 2014

Related U.S. Application Data

(63) Continuation of application No. 12/486,925, filed on Jun. 18, 2009, now abandoned.

(30) Foreign Application Priority Data

Jul. 16, 2008 (KR) .................. 10-2008-0068992

(51) Int. Cl.
G06F 3/06 (2006.01)
(52) U.S. Cl.
CPC ............. *G06F 3/061* (2013.01); *G06F 3/068* (2013.01); *G06F 3/0625* (2013.01); *G06F 3/0634* (2013.01); *G06F 3/0659* (2013.01); *G06F 3/0676* (2013.01); *Y02B 60/1246* (2013.01)

(58) Field of Classification Search
None
See application file for complete search history.

(56) References Cited

U.S. PATENT DOCUMENTS

| 6,785,767 | B2 | 8/2004 | Coulson |
| 7,127,549 | B2 | 10/2006 | Sinclair |
| 7,903,775 | B2 | 3/2011 | Ku |
| 2005/0172067 | A1* | 8/2005 | Sinclair ..................... 711/103 |
| 2006/0026315 | A1* | 2/2006 | Hong et al. ................. 710/60 |
| 2007/0101168 | A1 | 5/2007 | Atkinson |
| 2007/0106836 | A1 | 5/2007 | Lee |
| 2007/0118682 | A1* | 5/2007 | Zhang et al. ............. 711/103 |
| 2009/0049234 | A1 | 2/2009 | Oh |

FOREIGN PATENT DOCUMENTS

| JP | 11249821 | 9/1999 |
| JP | 2000250713 | 9/2000 |
| JP | 2005237247 | 11/2005 |

* cited by examiner

*Primary Examiner* — Daniel Tsui
(74) *Attorney, Agent, or Firm* — Cesari & Reed, LLP; Kirk A. Cesari

(57) ABSTRACT

Apparatuses having variable communication speeds are disclose. In one example, an apparatus may comprise a controller configured to: receive a signal from a host, the signal being compatible with a data communication protocol at a first data communication speed; selectively implement a first data communication protocol from a plurality of data communication protocols to communicate with a first memory or implement a second data communication protocol from the plurality of data communication protocols to communicate with a second memory based on the data communication speed; store data in the first memory via the first data communication protocol when the data communication speed is a first speed; and store data in the second memory via the second data communication protocol when the data communication speed is a second speed that is different than the first speed.

11 Claims, 3 Drawing Sheets

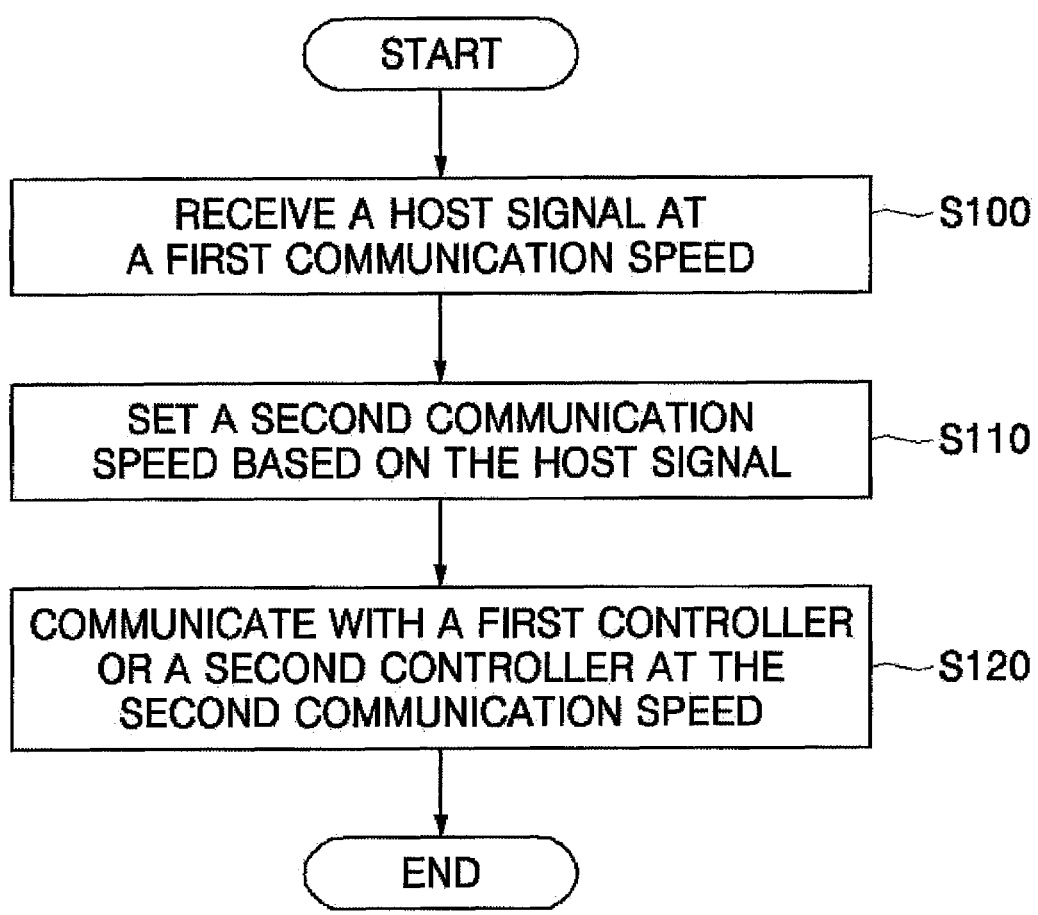

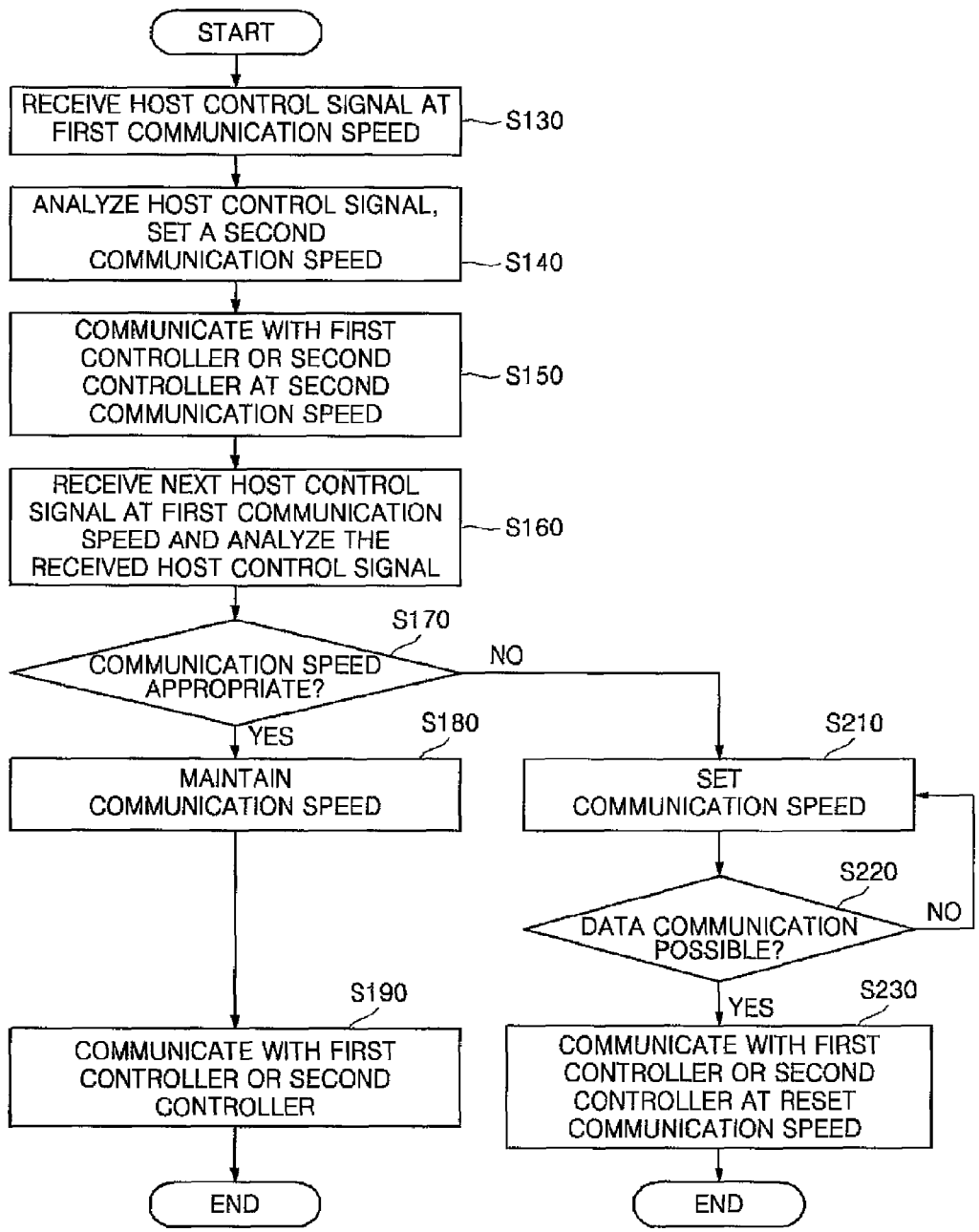

CONTROLLER, DATA STORAGE DEVICE, AND DATA COMMUNICATION SYSTEM HAVING VARIABLE COMMUNICATION SPEED

CROSS REFERENCE TO RELATED APPLICATIONS

The present application is a continuation of and claims priority to pending U.S. patent application Ser. No. 12/486,925, entitled CONTROLLER, DATA STORAGE DEVICE, AND DATA COMMUNICATION SYSTEM HAVING VARIABLE COMMUNICATION SPEED, filed on Jun. 18, 2009, which claims priority under 35 U.S.C. §119 to Korean Patent Application No. 10-2008-0068992 filed on Jul. 16, 2008, the subject matter of both are hereby incorporated by reference.

BACKGROUND

The present invention relates to a data communication technology, and more particularly, to a controller capable of adaptively adjusting the speed or data rate of communication. Embodiments of the invention include controllers capable of adjusting communication speed, data storage devices including such a controller, and data communication systems including such a data storage device.

The hard disk drive (HDD) is a conventional, magnetic storage device that is highly competitive on a price per stored data basis. The HDD is capable of storing a large volume of data, but data access (read/write) speeds are not exceptional. However, due to low manufacturing costs, HDDs are widely used as bulk data storage units.

The HDD generally reads/writes data from/to a rotating magnetic disk (or recording medium) using a mechanical read/write head. The mechanical nature of the read/write head and its constituent movable components suffer from such problems as a vibration, noise, heat build-up and the resulting operating distortion, mode-specific disturbance issues, complexity of manufacture, and increasing cost as size constraints become more severe. HDDs also require a relatively long time to retrieve stored data, as the disk must be mechanically rotated to the sector storing the requested data and the read/write head must be moved over the sector. Increasing the data access speed of HDDs requires faster operating speeds for disk rotation and read/write head movement. Unfortunately, such increases tend to consume more power and aggravate some of the foregoing problems, such as noise and heat.

Particularly in the context of small, portable, electronic host devices, a data storage device is required that provides better data access speeds with reduced power consumption.

SUMMARY

In one embodiment, an apparatus may include an interface to receive commands and data from a host, a data storage area configured to store settings corresponding to a plurality of communication protocols, and a processor. The processor may be configured to: determine a data communication speed between the interface and the host, selectively implement a first data communication protocol from the plurality of communication protocols to communicate with a first memory or a second data communication protocol from the plurality of communication protocols to communicate with the first memory based on the data communication speed, store data in the first memory via the first data communication protocol when the data communication speed is a first speed, and store data in the first memory via the second data communication protocol when the data communication speed is a second speed different than the first speed.

In another embodiment, an apparatus may include a controller configured to: receive a signal from a host, the signal being compatible with a data communication protocol at a first data communication speed, selectively implement a first data communication protocol from a plurality of data communication protocols to communicate with a first memory or implement a second data communication protocol from the plurality of data communication protocols to communicate with a second memory based on the data communication speed, store data in the first memory via the first data communication protocol when the data communication speed is a first speed, and store data in the second memory via the second data communication protocol when the data communication speed is a second speed that is different than the first speed.

In yet another embodiment, an apparatus may comprise a data storage device configured to communicate with a host via multiple communication speeds. The data storage device may include a first controller configured to access data at a first memory, a second controller configured to access data at a second memory, and a third controller. The third controller may be configured to: receive a signal from the host, implement a first data communication protocol to communicate with the first controller when a first data communication speed is detected, and implement a second data communication protocol to communicate with the second controller when a second data communication speed is detected, the first data communication speed being different than the second data communication speed.

BRIEF DESCRIPTION OF THE DRAWINGS

These and/or other aspects and advantages of the present inventive concept will become apparent and more readily appreciated from the following description of the embodiments, taken in conjunction with the accompanying drawings of which:

FIG. 2 is a flow chart summarizing a method of varying the communication speed of a data communication system including a main controller according to an embodiment of the invention; and FIG. 3 is a flowchart summarizing a method of varying the communication speed of a data communication system including a main controller according to another embodiment of the invention.

DESCRIPTION OF EMBODIMENTS

Figure 1:
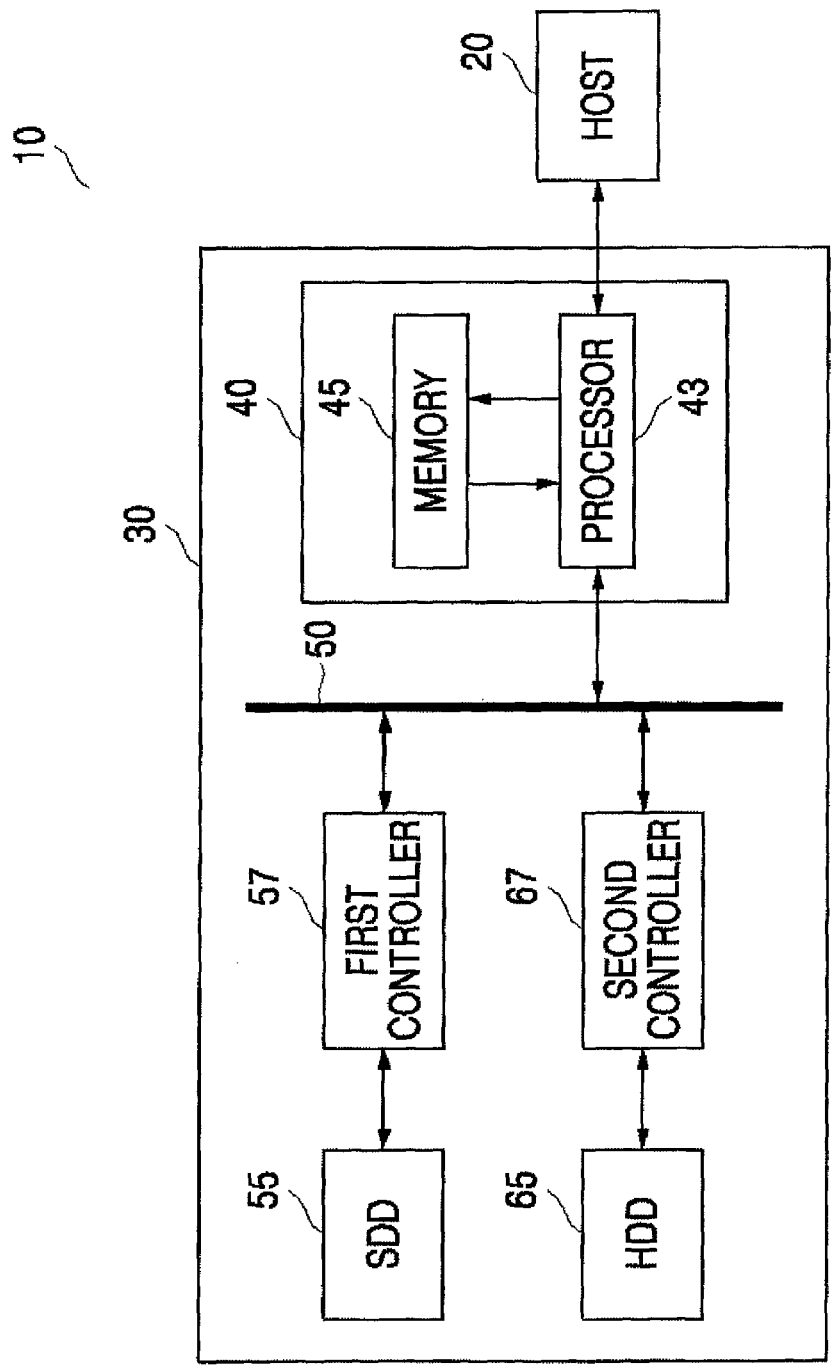
FIG. 1 is a schematic block diagram of a data transmission system including a data storage device according to an embodiment of the invention.

Reference will now be made in detail to certain embodiments of the inventive concept, examples of which are illustrated in the accompanying drawings. Throughout the written description and drawings like reference numerals refer to the like or similar elements.

FIG. 1 is a schematic block diagram of data communication system 10 including a data storage device 30 according to an embodiment of the invention. The data communication system 100 may be a computer system, a terminal device system, or an input/output device system. The data communication system 10 may be included within any type of consumer equipment (CE), (e.g., a HDD recorder, personal portable terminal such as a cellular phone and PDA, PC computer, laptop computer, desktop computer, navigator device, home automation system, MP3 music player, camcorder, video player, storage server, portable multimedia player (PMP), etc.). Data communication system 10 generally comprises a host 20 (e.g., a host controller, I/O controller, microprocessor, CPU, chip-set, etc.) and data storage device 30 designed and operated in accordance with an embodiment of the invention.

In the illustrated embodiment of FIG. 1, data communication system 10 is assumed to operate according to a serial data communication protocol, such as the conventionally understood Serial ATA (SATA) interface specification. That is, serial data is exchanged between host 20 and data storage device 30 according to one or more conventional protocols controlled by host 20. The SATA protocol is merely one example that will be used to describe the illustrated embodiment. For example, the SATA protocol generally provides SATA Gen1 and SATA Gen 2 data communications capabilities allowing the exchange of serial data at (e.g.,) 1.5 Gbps and 3.0 Gbps, respectively.

Under these working assumptions, the SATA Gen1 may result in performance problems given its relatively slow data communication capabilities between host 20 and a main controller 40 within data storage device 30. Nonetheless, SATA Gen1 runs with low power consumption and is desirable over SATA Gen2 where data communication demands do not exceed its capabilities. On the other hand, the SATA Gen2 offers much faster data communication capabilities between host 20 and main controller 40, but does so at higher power consumption than SATA Gen 1. Ideally, the lower speed, lower power consumption protocol (e.g., SATA Gen1) will be used whenever practicable, and the higher speed, higher power consumption protocol will be used only as needed to provide high demand data communication between host 20 and data storage device 30.

Data storage device 30 includes a first (higher throughput) data storage device 55 (e.g., an SDD), a second (lower throughput) data storage device 65 (e.g., an HDD), a first controller 57 controlling the operation of the first storage device 55, a second controller 67 controlling the operation of the second data storage device 65, a system bus 50, and main controller 40. Main controller 40 controls the overall data communication, including the protocol-in-use and/or speed of data communication. Main controller 40 thus generates a plurality of control signals that define the operation of the first controller 57 and the second controller 67. Payload data and related command, control and address signals are communicated between the first controller 57 and second controller 67 via system bus 50. In one more specific embodiment of the invention, the first data storage device 55 and the first controller 57 may be embodied on a single integrated circuit chip and/or second data storage device 65 and the second controller 67 may be embodied on a separate integrated circuit chip.

According to one embodiment of the invention, the first data storage device 55, the second storage device 65, the first controller 57, and the second controller 67 may be implemented is a so-called hybrid HOD, wherein the main controller 40 serves as a storage controller or a bridge chip within the hybrid HOD.

The first data storage device 55 may be implemented in one or more nonvolatile memory device(s) such as a programmable read only memory (PROM), an erasable programmable read only memory (EPROM), an electrically erasable programmable read only memory (EEPROM), a flash memory, a ferroelectrics random access memory (FRAM), a magnetic random access memory (MRAM), a phase change random access memory (PRAM), a nano random access memory (NRAM), a silicon-oxide-nitride-oxide-silicon (SONOS), or racetrack memory. In one embodiment of the invention, the first data storage device 55 is implemented in nonvolatile memory as a so-called Solid State Drive/disc (SSD). As is conventionally understood, the SOD is an excellent device for storing frequently accessed data, such as operating system programming.

The second data storage device 65 may be implemented as a magnetic storage device, such as a HOD. This type of implementation allows bulk data or payload data less frequently accessed to be stored magnetically at the low costs associated with HODs. Such bulk data may include text files, video files, and/or an image files.

The main controller 40 communicates with first controller 57, second controller 67, and host 20. In the illustrated embodiment, main controller 40 includes a memory 45 storing protocol program data. The term "protocol program data" is used to denote certain data controlling at least the communication (i.e., transmission and receipt) speed for data being exchanged between a main controller processor 43 and at least one of first controller 57, second controller 67, and host 20. That is, the processor 43 is capable of executing the protocol program data to define one or more data protocols used by main controller 40.

The protocol program data executed by processor 43 may be selected from a group of protocol program data stored in memory 45 as indicated by control signal(s) received from host 20. A default protocol program data may be executed upon initial start-up of the data storage device 30. This default protocol program data will define a first data communication speed at which the initial control signals from host device 30 are received. The processor 43 analyzes the received host control signals, and may thereafter adjust the data transmission speed in accordance with protocol program data stored in memory 45 in response to the host control signals. For example, a second data communication speed faster than the first data communication sped may be selected in relation to data being stored in the first data storage device 55 and/or the second data storage device 65.

FIG. 2 is a flowchart summarizing a method of varying the data communication speed within a communication system including a main controller according to an embodiment of the invention. It is assumed that host 20 initially communicates with main controller 40 using the 8ATA Gen1 protocol (e.g., as a default or start-up protocol). Hence, main controller 40 initially receives the host control signal from host 20 at a first communication speed, (e.g., 1.5 Gbps) (S100). The host control signal received from host 20 may take many forms and may be associated with an access operation (e.g., a read command or write command). The host control signal may include payload data, overhead data, error correction coding, address information, and/or control information, etc.

It is now further assumed that as part of the received host control signal, main controller 40 now retrieves and executes protocol program data stored in memory 45 that enables processor 43 to implement a second (higher) data communication speed (e.g., SATA Gen2 or one of a plurality of transmission speeds that may be set at $1.5*(2^{n-1})$Gbps, where "n" is a natural number. (S120). Memory 45 may store any reasonable number of protocol program data, each respectively defining a data transmission speed, data transmission parameters, an error correction code type, etc.

Using the second data communication protocol running at the second data communication speed (e.g., 3.0 Gps), as indicated by the host control signal, main controller 40 may communicate payload data to first data storage device 55 or second storage device 65. In the working example, the second higher data communication speed is more typically used to communicate frequently accessed data between the first data storage device 55 and processor 43 via data bus 50. In contrast, when the host control signal indicates a requirement to store bulk data in the second data storage device 65, the first data communication protocol running at the first (slower) data communication speed (e.g., 1.5 Gps) may be used.

In this manner, various data operations (e.g., read, write, program, erase, verify, etc.) may be performed by data storage device 30 in relation (i.e., in view of) to the nature of the data to be stored and the actual type of data storage device to be used in the storage process. The main controller 40 may communicate with at least one of first controller 57, which controls operations of a first data storage device 55, and second controller 67 for controlling operations of a second data storage device 65 (S120). In the foregoing, the communication protocol and resulting data communication speed between the main controller 40 and host 20 may be different from the data communication protocol and the resulting data communication speed between the main controller 40 and either one or both of controllers 57 and 67.

That is, main controller 40 may perform "primary operation" with the host 20 based on the content of a host control signal using a first data communication protocol selected from a group of possible data communication protocols. However, execution of the primary operation may require one or more "secondary operations" between the main controller 40 and one or both controllers 57,67. Such secondary data access operation(s) may be performed at an entirely different data communication speed using different protocol program data. For example, main controller 40 may access first data storage device 55 by communicating with first controller 57 via system bus 50 at 3.0 Gbps, and may access second data storage device 65 by communicating with second controller 67 via system bus 50 at 1.5 Gbps.

For convenience of explanation in the foregoing example, it has been assumed that host 20 communicates with main controller 40 using a conventionally defined SATA interface specification, selected from SATA Gen1, SATA Gen2, SATA Gen3, etc. However, while host 20 may mandate that main controller 40 use a SATA interface specification during a primary operation, main controller 40 may perform one or more secondary operations using a completely different (i.e., nonSATA interface specification) type of data communication protocol. Further, while the emphasis in the foregoing examples has been placed on communication speed, any other type of data communication protocol parameter may be additionally or alternately varied.

FIG. 3 is a flowchart summarizing a method for varying the communication speed within a data communication system including a main controller according to an embodiment of the invention.

First, host 20 is assumed to communicate with main controller 40 using a first data communication protocol (e.g., SATA Gen1), such that main controller 40 receives a host control signal at a first communication speed, (e.g., 1.5 Gbps) (S130). The host control signal defines a primary operation (e.g., a read/write operation) to be executed between host 20 and data storage device 30. Thus, the host control signal may include payload data, address data, command or control information, etc.

In this regard, main controller 40 executes first protocol program data stored in memory 45 that corresponds with the first data communication protocol in order to receive the host control signal. It is assumed that the host control signal received by main controller 40 mandates the use of a second data communication protocol establishing a second data communication speed (e.g., 3.0 Gps), different from the first data communication speed (S140). In response to the received host control signal and at the established second data communication speed, main control 40 now communicates with one of first controller 57 or second controller 67 (S150). In the illustrated example, it is further assumed that the second data communication speed is faster than the first and that the processor 43 stores frequently accessed data (i.e., program code implementing as routines) in first data storage device 55. The actual transfer and storage of the as program code from main controller 40 and first data storage device 55 via system bus 50 and first controller 57 is a secondary operation executed by main controller 40 in response to the primary operation indicated by the host control signal received from host 20.

Subsequent to the execution of the foregoing primary operation, the main controller 40 receives a next host control signal indicating another primary operation. In similar vein, the next host control signal is analyzed upon receipt (S160).

Main controller 40 is currently operating in accordance with a defined data communication protocol. This data communication protocol mayor may not be appropriate to the execution of the next primary operation or a corresponding next secondary operation. Accordingly, the current data communication protocol running on main controller 40 must be evaluated in relation to the next host control signal and its constituent data (S170).

If the current data communication protocol (and corresponding data communication speed) is appropriate, the current data communication protocol is maintained (S180), and main controller 40 will communicate with the first controller 57 or second controller 67 using the maintained data communication protocol (S190). For example, assuming the first primary operation stored (i.e., programmed) as program data to the first data storage device 55 using the second data communication protocol running at the higher second data communication speed, the next primary operation might store (i.e., program) additional as patch data to the first data storage device 55. In such a sequence, the second data communication speed established in (S140) is merely maintained, as between the first and next primary operations and their constituent secondary operations programming data to the first date storage device 55.

However, if the current data communication protocol (and corresponding data communication speed) is not appropriate, the current data communication protocol must be set (S210). To set a new data communication protocol according to the next host control signal, main controller 40 may access memory 45 to obtain corresponding protocol program data. In certain instances, host 20 may request a data communication protocol outside the set of data communication protocols enabled with the data storage device 30. In such circumstances, an appropriate indication may be returned to host 20 from processor 43, and host 20 may request another data communication protocol and corresponding speed (S220). Once a new data communication protocol has been selected, main controller 40 may communicate data implicated in the next host control signal to/from the first or second data storage device 55,65 via system bus 50 and respective first and second controller 57,67 (S230).

For example, after storing the OS program data in a first primary operation, the host may request storage of bulk file data to the second data storage device 65. This download of bulk data may be run at a lower speed since access download times associated with the second data storage device 65 are considerably less than the access download times for the first data storage device 55. Thus, "setting" a new data communication protocol may vary the resulting data communication speed up or down according to the received host control signal and its constituent data.

Main controller 40 may also monitor the state of system bus 50 and generate one or more control signals in accordance with this monitoring function. The data communication protocol associated with a secondary operation between main controller 40 and one or both of first and second controllers 57 and 67 may be selected (or set) in view of the system bus state, and/or the inflow of data from host 30. For example, if the system bus monitoring function indicates that system bus 50 is idle (or busy), main controller 40 may adjust the current data communication protocol accordingly.

As described above, data communication system 10 according to an embodiment of the invention may perform data communication between main controller 40 and first controller 57 and/or second controller 67 at a different data communication speed and using a different data communication protocol during a secondary operation than is used during a primary operation. The selection of an appropriate data communication protocol may take into account host operating conditions, user option selections, etc. This capability allows enhanced device compatibility between data storage device 30 and numerous hosts 20. Additionally, an improved balance between performance (e.g., data throughput speeds) and power consumption may be had.

Although several embodiments of the inventive concept have been shown and described, it will be appreciated by those skilled in the art that changes may be made in these embodiments without departing from the scope of the appended claims and their equivalents.

What is claimed is:

1. An apparatus comprising:
    a data storage device configured to communicate with a host via multiple communication speeds, the data storage device including:
    a first controller configured to access data at a first memory, the first controller and the first memory distinct from the host;
    a second controller configured to access data at a second memory, the second controller and the second memory distinct from the host; and
    a third controller configured to:
        receive a signal from the host;
        implement a first data communication protocol to communicate with the first controller when a first data communication speed associated with the signal is detected; and
        implement a second data communication protocol to communicate with the second controller when a second data communication speed associated with the signal is detected, the first data communication speed being different than the second data communication speed.

2. The apparatus of claim 1, further comprising the data storage device configured to receive at least one of command from the host indicating a communication protocol to select.

3. The apparatus of claim 1, wherein the first data communication protocol and the second data communication protocol each comply with at least one serial ATA (SATA) interface specification.

4. The apparatus of claim 1, further comprising the first memory and the second memory are both non-volatile memory, and the third controller is configured to: selectively implement the first data communication protocol to communicate with the second memory and selectively implement the second data communication protocol to communicate with the second memory based on the determined data communication speed.

5. The apparatus of claim 1, wherein the second data communication speed is faster than the first data communication speed.

6. The apparatus of claim 5, wherein the second data communication speed is twice as fast as the first data communication speed.

7. The apparatus of claim 1, further comprising a system bus allowing communication between the third controller, the first controller, and the second controller.

8. The apparatus of claim 7, wherein the first controller is adapted to control data storage to a non-volatile solid state memory, and the second controller is adapted to control data storage to a disk memory.

9. The apparatus of claim 1, wherein the third controller comprises:
    a data storage area configured to store a plurality of protocol program data respectively corresponding to the first data communication protocol and the second data communication protocol; and
    a processor configured to receive the signal, execute the first data communication protocol, and execute the second data communication protocol.

10. The apparatus of claim 1, further comprising the first memory is a non-volatile solid state memory and the second memory is a non-volatile disc memory.

11. The apparatus of claim 1, wherein the first memory and the second memory are both non-volatile memory.

* * * * *